United States Patent [19]

Tokutu et al.

[11] Patent Number: 5,308,930
[45] Date of Patent: May 3, 1994

[54] WEIGHING MACHINE WITH WEIGHT DETECTING CONVEYOR

[75] Inventors: Harunori Tokutu; Shoko Tajiiri; Yukio Wakasa, Shiga, all of Japan

[73] Assignee: Ishida Scales Mfg. Co., Ltd., Kyoto, Japan

[21] Appl. No.: 967,824

[22] Filed: Oct. 28, 1992

Related U.S. Application Data

[63] Continuation-in-part of Ser. No. 862,742, Jun. 26, 1992.

[51] Int. Cl.⁵ .............................................. G01G 19/22
[52] U.S. Cl. .................................. 177/25.13; 177/50; 177/119; 177/164
[58] Field of Search .................. 177/25.13, 50, 119, 177/164; 364/567

[56] References Cited

U.S. PATENT DOCUMENTS

| | | | |
|---|---|---|---|
| 3,857,488 | 12/1974 | Le Cren | 177/211 X |
| 3,889,915 | 8/1975 | Williams, Jr. et al. | 177/50 X |
| 4,231,439 | 11/1980 | Hall, Jr. et al. | 177/25.13 |
| 4,709,770 | 12/1987 | Kohashi et al. | 177/50 |
| 4,817,026 | 3/1989 | Inoue et al. | 364/567 X |
| 4,951,763 | 8/1990 | Zimmerman et al. | 177/164 |
| 5,062,492 | 11/1991 | Inoue | 177/25.14 |
| 5,119,893 | 6/1992 | Jost | 177/16 |
| 5,130,938 | 7/1992 | Inoue | 364/567 |

Primary Examiner—Benjamin R. Fuller
Assistant Examiner—Randy W. Gibson
Attorney, Agent, or Firm—Heller, Ehrman, White & McAuliffe

[57] ABSTRACT

A weighing machine has a weighing conveyor with a conveyor belt supported by a load cell and uses a digital filter to eliminate high-frequency components of weight signals from the weighing conveyor. In order to improve accuracy of measurement, operating conditions of the digital filter are set with regard to the length of the object to be weighed. Alternatively, time required for the object to be completely on the conveyor belt may be calculated or the timing for the zero-point adjustment for the load cell may be adjusted accordingly.

18 Claims, 9 Drawing Sheets

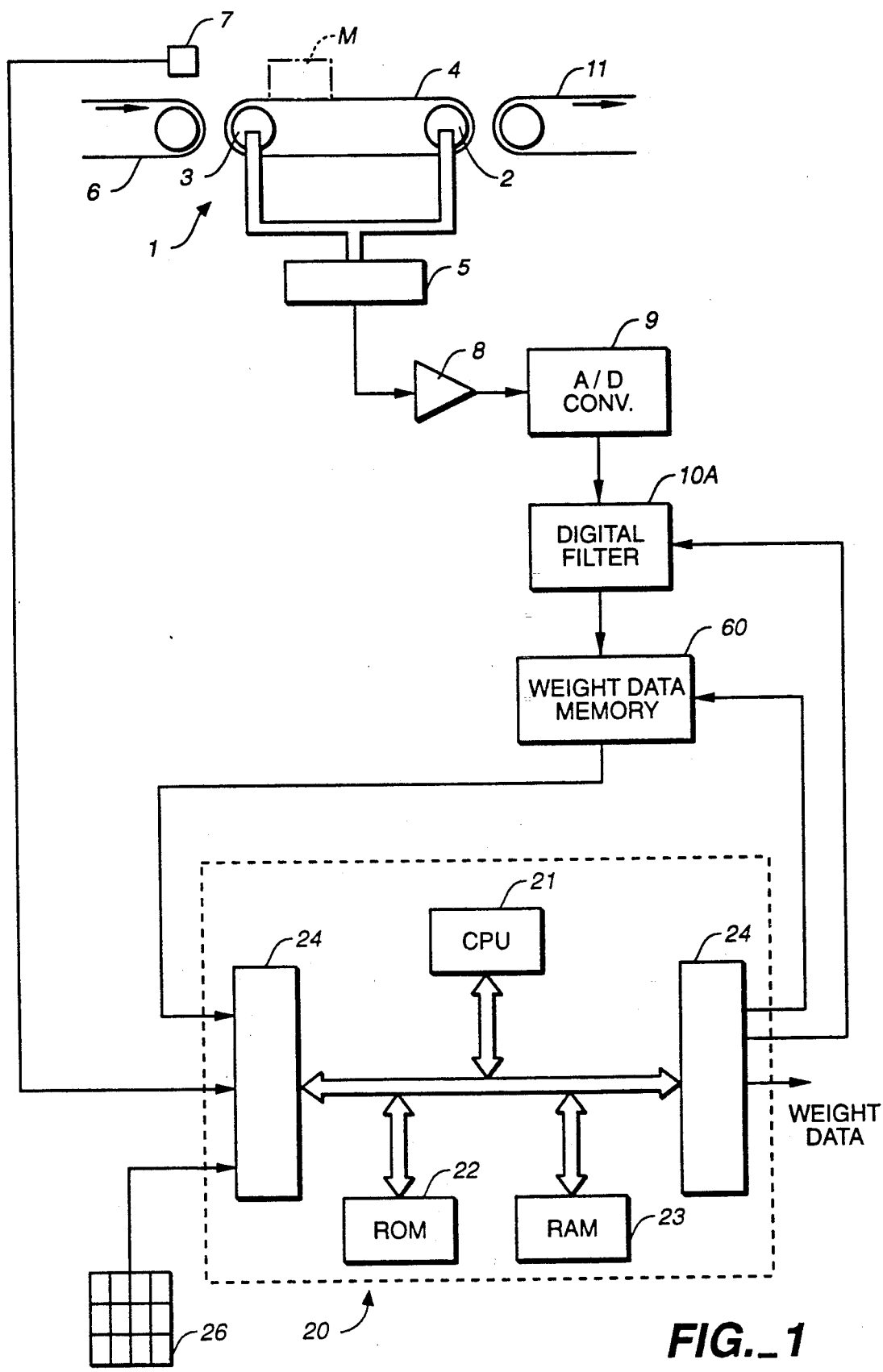
FIG._1

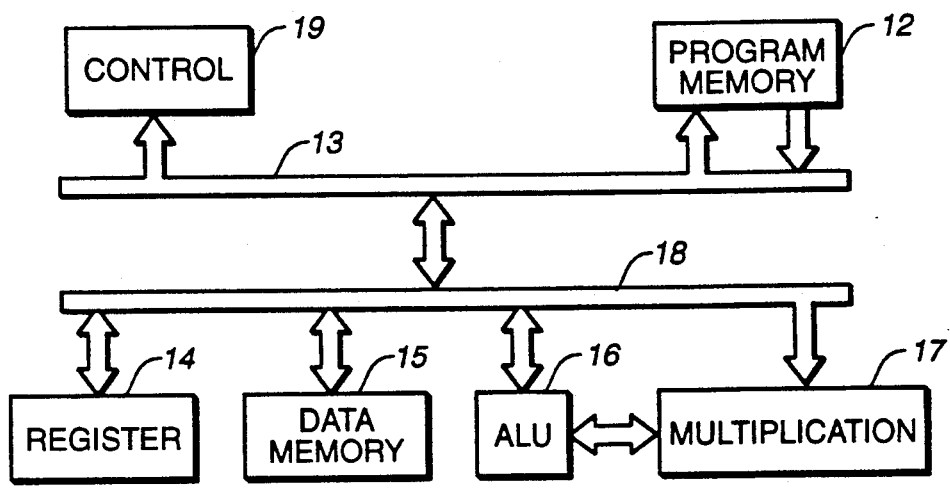
FIG._2
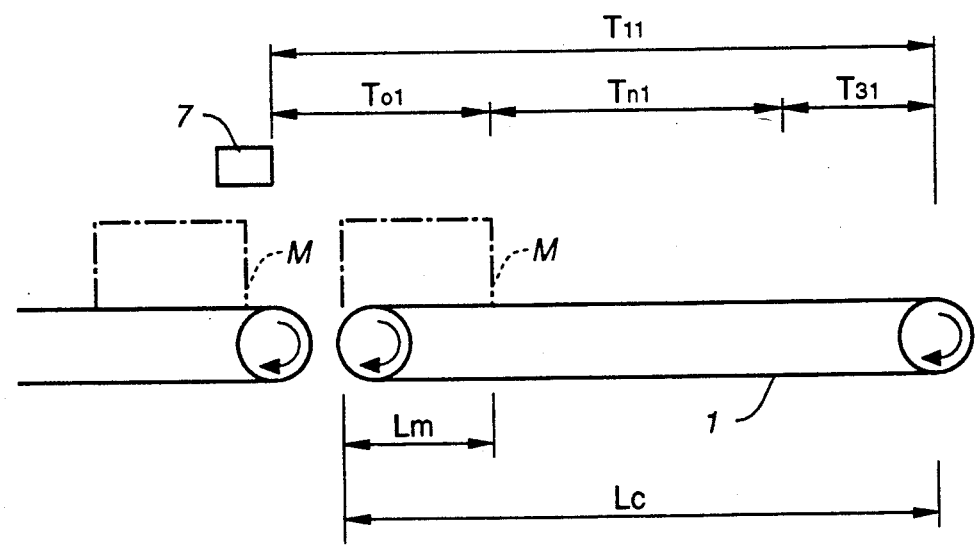
FIG._4

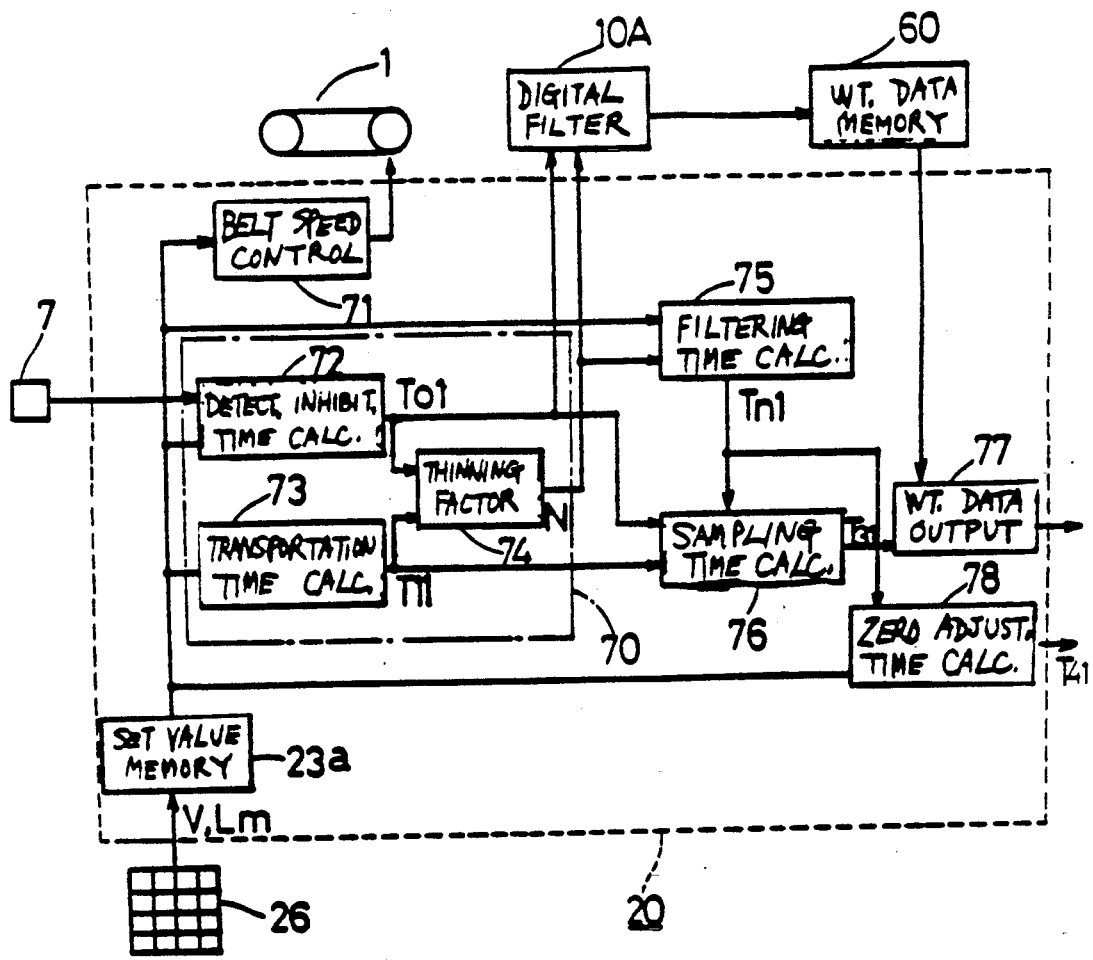
FIG._3

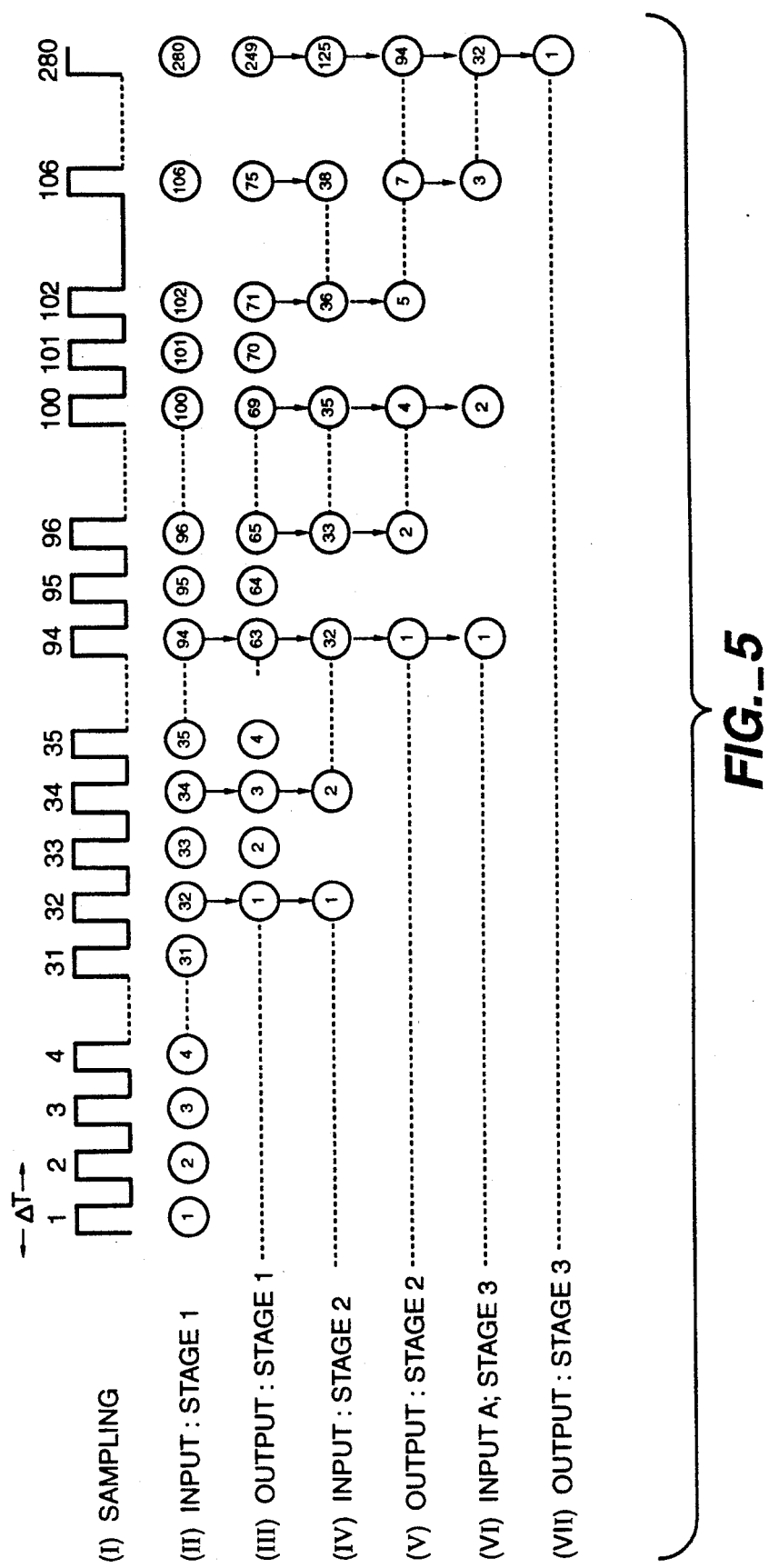
FIG._5

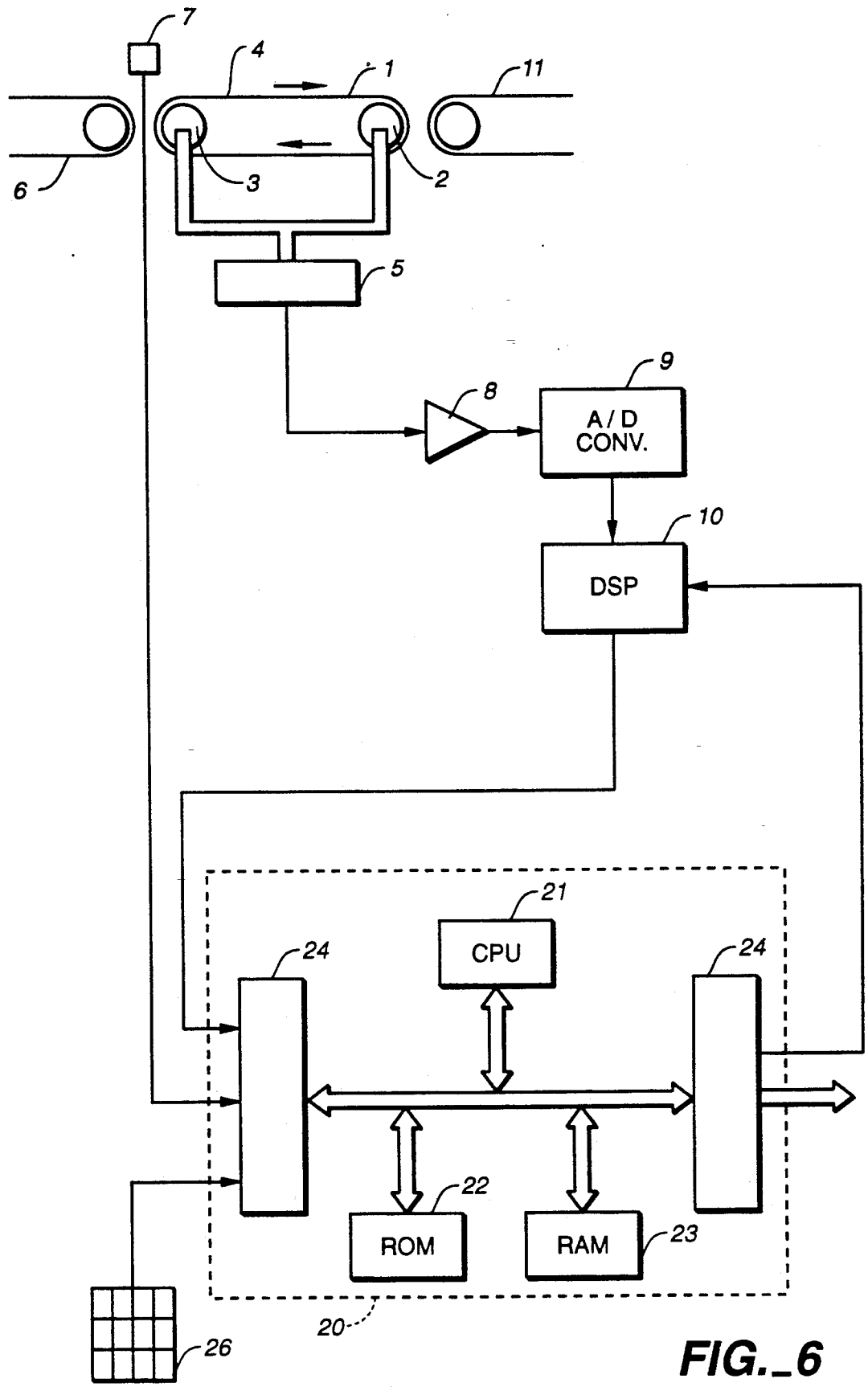
FIG._6

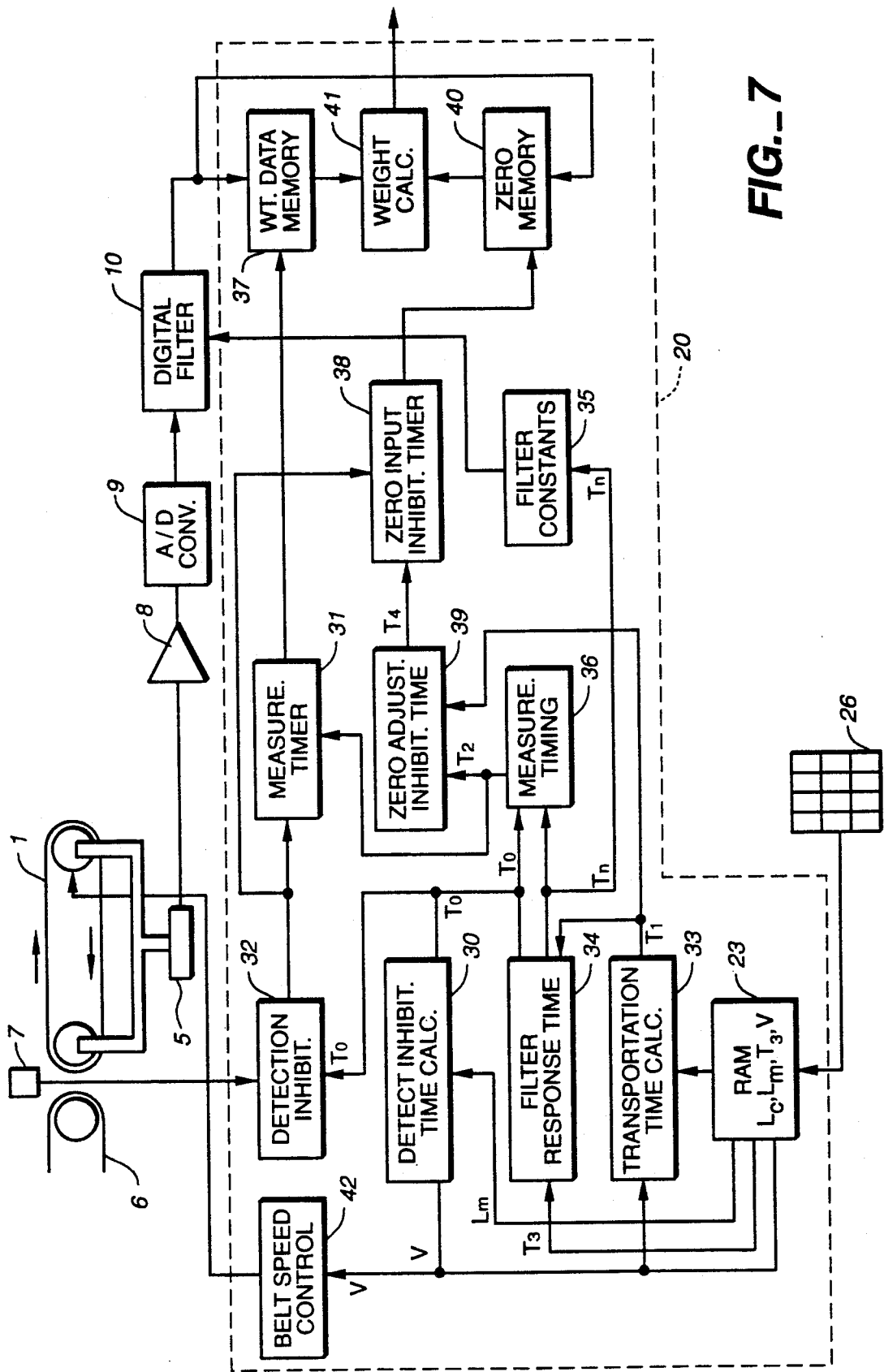
FIG._7

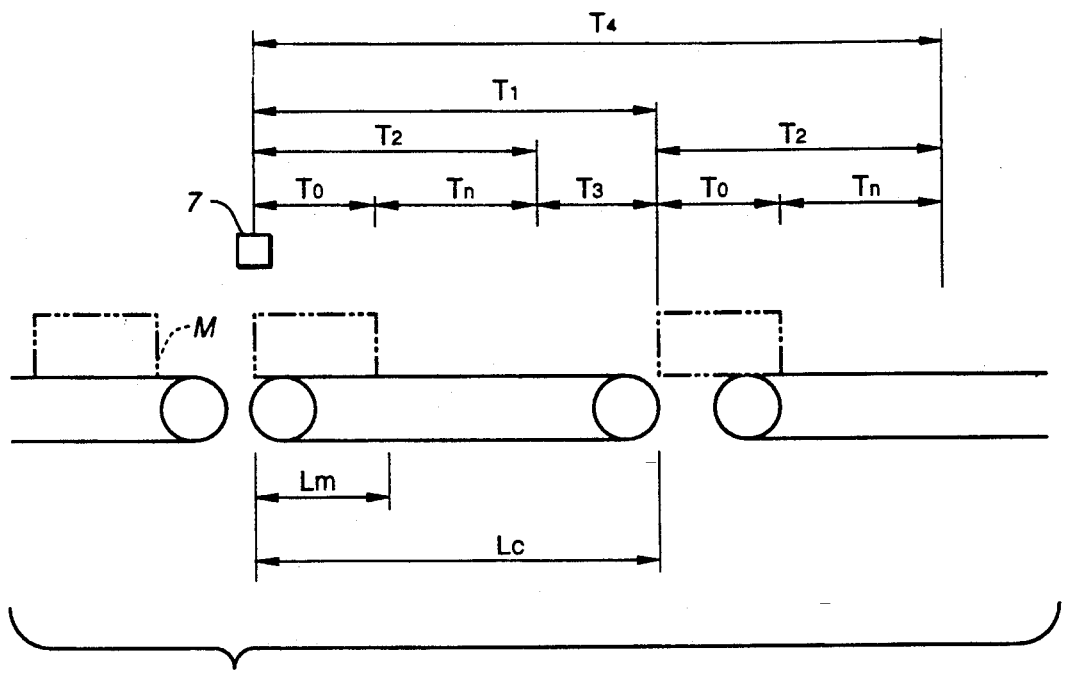
FIG._8
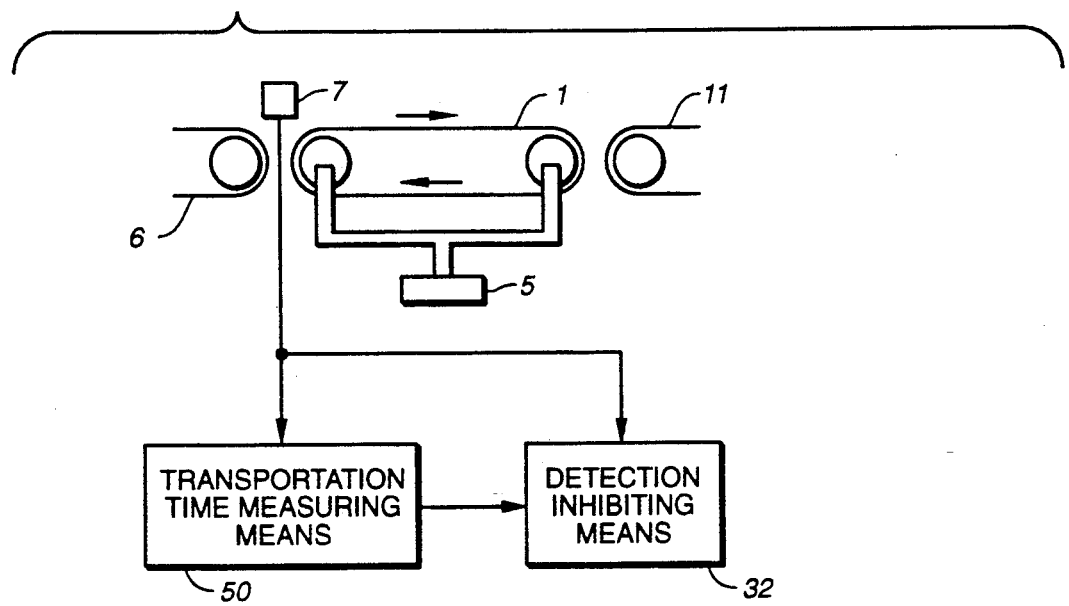
FIG._9

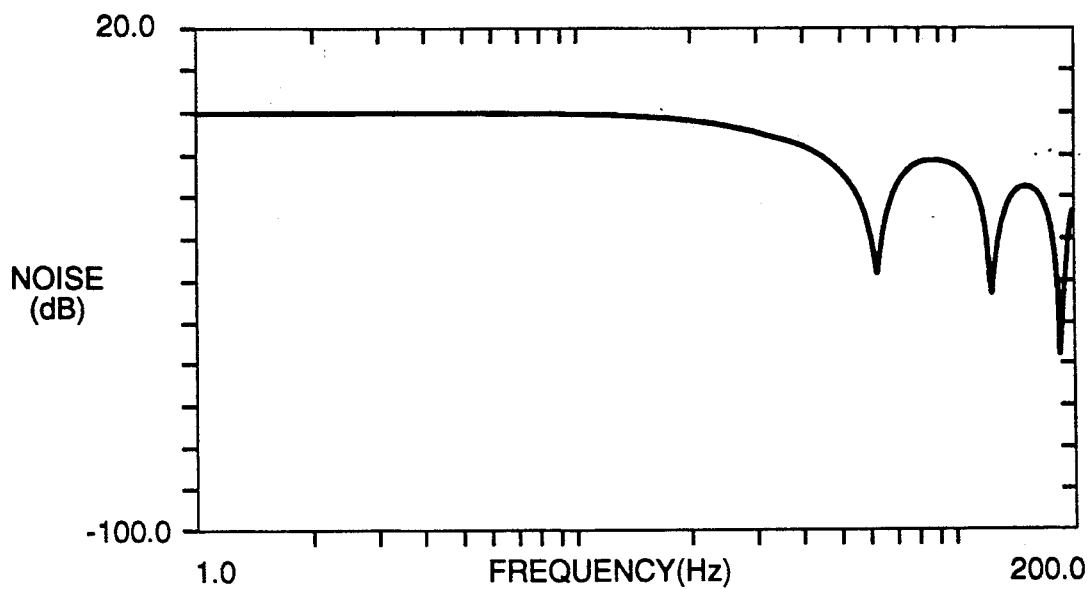
FIG._10
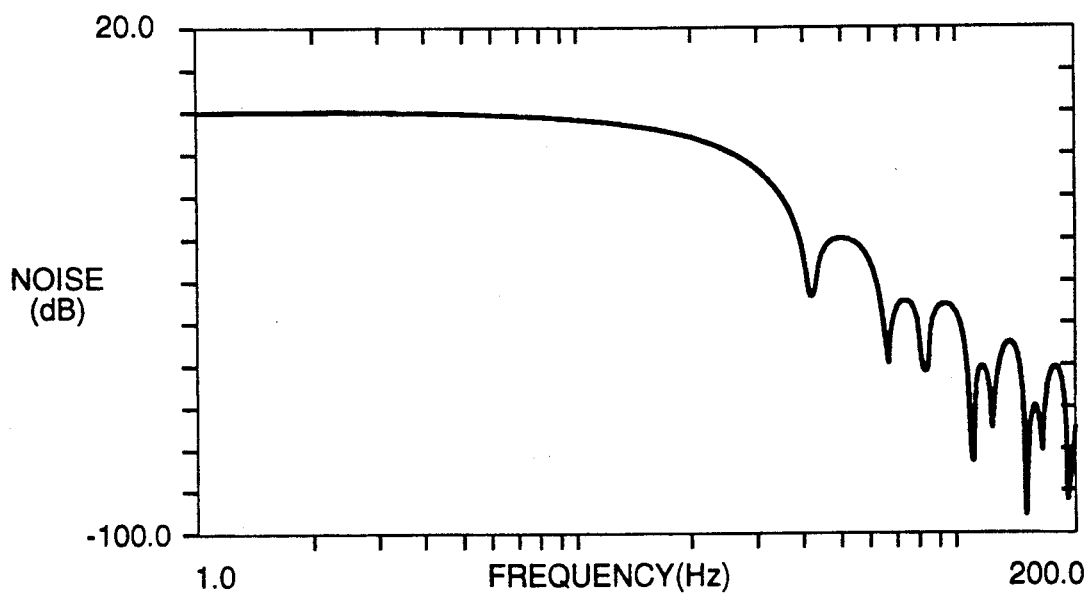
FIG._11

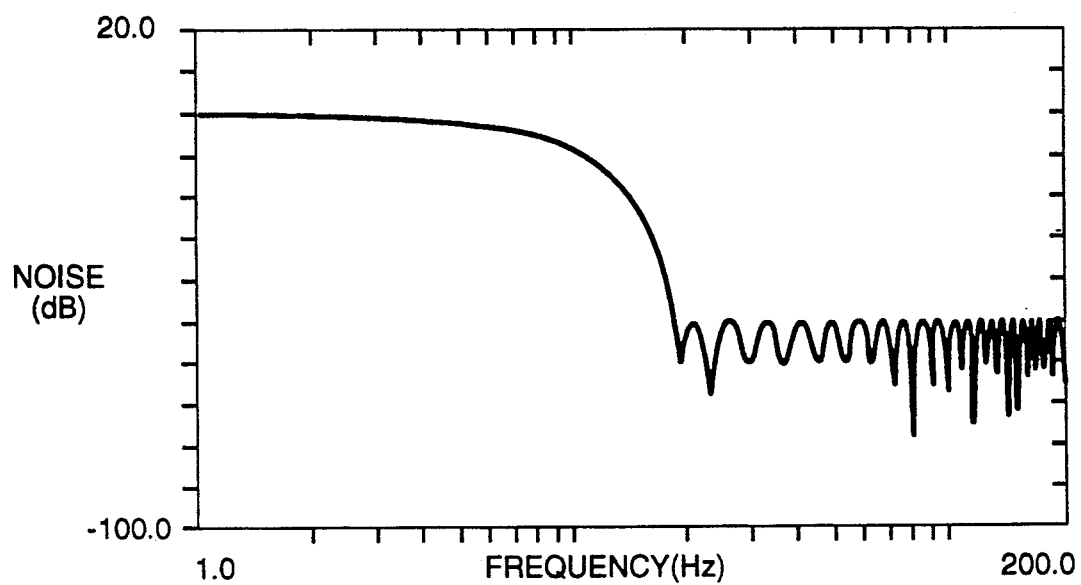
FIG._12
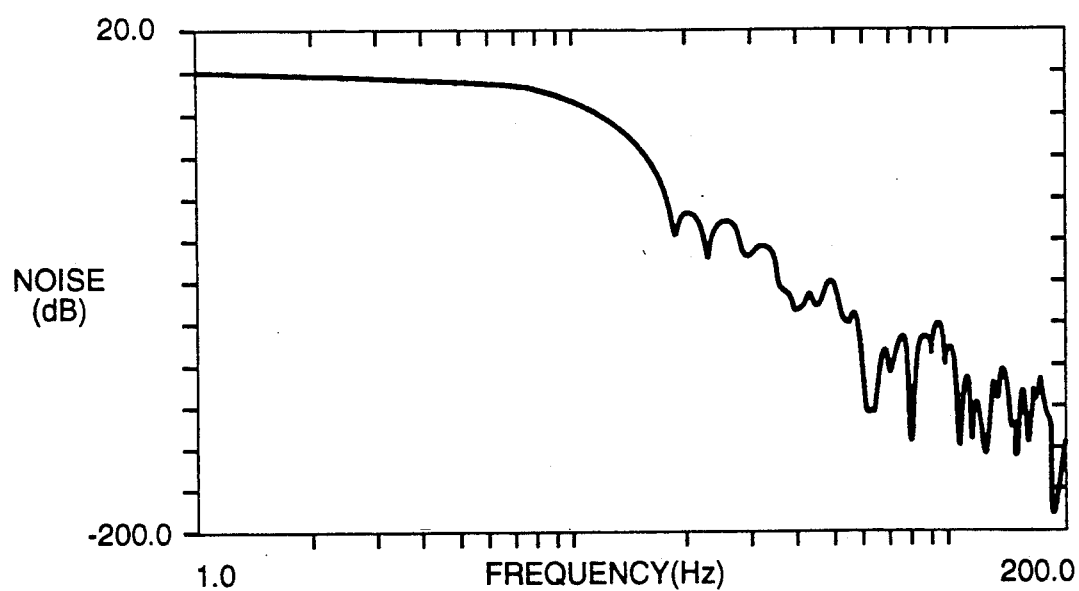
FIG._13

WEIGHING MACHINE WITH WEIGHT DETECTING CONVEYOR

FIELD OF TECHNOLOGY

This is a continuation-in-part of application Ser. No. 07/862,742 filed Jun. 26, 1992, to be abandoned.

This invention relates to a weighing machine of a kind having a conveyor belt supported by a load cell for measuring the weight of a target object while receiving it from a feed-in conveyor belt and transporting it onto a discharge conveyor belt.

BACKGROUND OF THE INVENTION

For measuring the weight of a target object such as a packaged product, it has been known to make use of a so-called weighing conveyor with a conveyor belt supported by a load cell serving as a weight detecting means. At one end of the weighing conveyor is a feed-in conveyor belt from which a packaged product is delivered. After its weight is measured, it is discharged onto a discharge conveyor belt and, if necessary, a selection mechanism is activated.

One of the problems associated with prior art weighing machines of this type has been that the result of measurement was severely affected by the length of the target object in the direction of its transportation (hereinafter simply referred to as its length). This problem has come to exist in the following three stages.

Firstly, a weight detecting means thus structured is directly subjected to the vibrations of the conveyor which it supports. As a result, the oscillatory load from the conveyor belt is added to the weight of the target object, and a correct weight value cannot be obtained by a direct measurement. For this reason, output signals from the weight detecting means are passed through a low pass filter for removing the components with relatively high frequencies caused by the aforementioned vibrations.

Since a low pass filter has an extremely large time constant, however, a stable output therefrom cannot be obtained until a certain length of time elapses after a target object is brought onto the weighing conveyor. In the case of a target object which is elongated in the direction of its transportation (hereinafter referred to as a long object), the entirety of the object can remain on the conveyor only for a short time, and an error is likely to occur if there is only a brief period of time available for the measurement.

In view of the problems of this type, Japanese Patent Publication Tokkai 60-79227 disclosed a weighing machine having a speed detector for the weighing conveyor such that the frequency band of the low pass filter can be adjusted according to the speed signal outputted from the speed detector. Such a weighing machine is capable of selecting an optimum frequency band for a given speed of the weighing conveyor, but there still remains the problem of measurement errors when objects of different lengths are to be weighed.

Secondly, since an error is more likely to occur in the measurement of a long object, a method has been considered whereby moment-by-moment weight data are prevented from being taken between the time when the target object reaches the weighing conveyor and the later time when the low pass filter begins to output stable weight data. In other words, a detector for the target object is provided on the object-receiving side of the weighing conveyor, and weight data are taken or not taken according to the detection signals from this detector. Such a detector usually comprises a light-emitting element and a light-receiving element placed near the weighing conveyor such that the reflected light from the target object or the screening of the light thereby may be detected. In the case of an odd-shaped target object, that is, if its top surface has protrusions and indentations, a single object may screen the light twice while passing by such a detector, and the outputted signals may indicate that two objects have passed. This will cause an error in establishing the reference time for data processing and result in incorrect measurements.

In order to overcome this difficulty, it has been known to enter from a data input means, such as a keyboard, a so-called detection inhibiting time period during which, after a detection signal is outputted from the target object detector, signals from this detector are prevented from being accepted.

If the length of the target object or the conveyor speed is varied, however, a new value of the detection inhibiting time period must be determined by measuring the length of the target object and dividing it by the belt speed, and the value thus determined must be entered through the keyboard.

Thirdly, a weighing machine of this type is adapted to keep determining an initial load value such as the weight of the conveyor, even when it is not loaded with any target object to be weighed. When there is no target object, such an initial load value is stored as the zero-point value, and the true weight of a target object is obtained by subtracting this zero-point value from the measured weight value. For this reason, it is extremely important for a weighing machine of this type to detect a no-load condition, and many methods for this purpose have been considered such as the method of monitoring the waveform of the signals from the weight detecting means in order to detect a no-load condition or that of using a timer to preliminarily set a time interval during which a no-load condition may be expected to have been established.

According to the former method, a zero-point adjustment circuit is activated after a no-load condition is detected. Thus, there is a time delay between the detection of a no-load condition and the actual start of a zero-point adjustment procedure, and this gives rise to a problem of reduced operating efficiency. By the latter method, on the other hand, the user cannot adjust to changes in the length of the target object or to the belt speed of the weighing conveyor. Thus, the timer would be set for a longer period than necessary in order to be on the safer side, and this also results in wasted time. In summary, there always remained a problem of reduced work efficiency for the weighing machine because of the waste of time between when a zero-point adjustment becomes possible and when an automatic zero-point adjustment procedure is actually started.

The present invention is for the purpose of eliminating these problems and its object is to provide a weighing machine of which the operation is not affected by changes in the length of the target object.

SUMMARY OF THE INVENTION

In order to accomplish the above and other objects by automatically setting optimum filter characteristics independent of any particular choice in the speed of the weighing conveyor or the length of the target object, a weighing machine embodying the present invention comprises a weighing conveyor having a weight detecting means supporting a conveyor belt for transporting a target object, data inputting means for inputting the belt speed of this weighing conveyor and the length of a target object, belt speed adjusting means for adjusting this belt speed to a set value, data processing condition setting means and digital filter means. The data processing condition setting means is for calculating optimum filtering conditions on the basis of the belt speed and the length of the target object. The digital filter means is adapted to receive a control signal from the data processing condition setting means and to thereby digitally filter weight signals from the weight detecting means.

If the belt speed of the weighing conveyor and the length of the target object are preliminarily inputted through the data inputting means, optimum conditions for the digital filter means are automatically set by the data processing condition setting means, and the digital filter means functions under these conditions. In short, highly reliable weight data can be obtained independent of the length of the target object.

According to a preferred embodiment of the invention, the data processing condition setting means is provided with thinning factor calculating means for determining operating conditions for the digital filter means for eliminating high-frequency components in weight signals such that highly reliable weight data can be obtained independent of the measurement frequency of the weight detecting means.

According to another preferred embodiment of the invention, the aforementioned thinning factor calculating means calculates a thinning factor on the basis of the difference between the detection inhibiting time during which a target object is completely transferred from the feed-in conveyor onto the weighing conveyor and the object transportation time during which the target object is transported by the weighing conveyor, and also of the number of necessary weight data outputted from the weight detecting means. In other words, the time during which the target object is completely on the weighing conveyor is obtained from the difference between the object transportation time and the detection inhibiting time, and the thinning factor is calculated on the basis of this time period and the number of necessary weight data. Thus, the digital filter means eliminates high-frequency components of weight signals by using the largest thinning factor that can be set. Accordingly, high-frequency components can be eliminated with improved efficiency.

In order to attain the aforementioned objects by automatically setting a detection inhibiting time on the basis of an inputted length value of the target object, a weighing machine according to the present invention may comprise a weighing conveyor, an object detecting means disposed on the feed-in side of this weighing conveyor, a data inputting means for inputting a length value of the target object, a detection inhibiting time calculating means and a detection inhibiting means. The detection inhibiting time calculating means is for calculating, on the basis of the inputted length value of the target object and the set belt speed, a transportation time corresponding to the length of the target object as the detection inhibiting time period. The detection inhibiting means serves to cause the detection signals from the object detecting means to be ignored until the aforementioned detection inhibiting time elapses from the time when the front end of the target object is detected by the object detecting means.

When the data inputting means of a weighing machine thus structured sets a length value of a target object, a corresponding transportation time is calculated from the belt speed which is preliminarily set and this length value, and this is accepted as the detection inhibiting time. Accordingly, the detection inhibiting time for ignoring the quasi-signals associated with the ON-OFF operations of the object detecting means is automatically set. Thus, there is no longer the need to calculate a new detection inhibiting time whenever the length of the target object is changed. As a result, the weighing operation can be simplified, the possibility of an error in setting a detection inhibiting time can be reduced to a minimum, and the reliability of measurement can be improved.

In order to attain the aforementioned objects of the invention by automatically setting a detection inhibiting time by transporting a target object just once, a weighing machine according to another embodiment of the present invention may include a weighing conveyor, an object detecting means as described above, means for measuring the output time of detection signals from the detecting means when a target object is transported onto the weighing conveyor and storing this output time as the detection inhibiting time corresponding to the length of the target object, and a detection inhibiting means as described above. When a target object is sent onto the weighing conveyor in a registration mode of operation of such a weighing machine, it is detected by the object detecting means and a detection signal is outputted. The output time of this detection signal is measured and the transportation time corresponding to the length of the target object is thereby determined and automatically set as the detection inhibiting time. When detection signals are outputted thereafter from the object detecting means in a weighing mode of operation, these signals are ignored from this time on until the aforementioned detection inhibiting time has elapsed. In this manner, signals can be processed with improved reliability after the front end of a target object is detected with certainty.

Since the length of the target object is automatically measured while it is being transported and the detection inhibiting time is thereby determined, a weighing machine according to this embodiment of the invention does not require the input of any data from a keyboard and hence can measure the weights of target objects efficiently even when their lengths vary frequently.

In order to attain the aforementioned objects of the invention by automatically setting an automatic zero-point adjustment inhibiting time corresponding to the length of a target object and to thereby prevent the occurrence of wasted time, a weighing machine according to still another embodiment of the present invention includes a weighing conveyor, a data processing condition setting means for calculating optimum filtering conditions from the belt speed of this weighing conveyor and the length of the target object, a digital filter means for receiving a control signal from this data processing condition setting means to thereby digitally filter weight signals from weight detecting means, and an automatic zero-point adjustment inhibiting time calculating means for calculating a zero-point adjustment inhibiting time on the basis of the length and the belt speed of the weighing conveyor, the length of the target object in the direction of its transportation and the filtering conditions.

With a weighing machine according to this embodiment, since optimum filtering conditions for its digital filter are set from the belt speed and the length of the target object, and the digital filter is operated under such optimum conditions, it is possible to obtain weight data which may be considered most dependable corresponding to the lengths of the target objects and the belt speed.

Moreover, zero-point adjustment is inhibited for a certain period of time from the time when a target object is transported onto the weighing conveyor, this period of time corresponding to the sum of a loading time determined by the belt speed, the length of the weighing conveyor and the length of the target object and a filter response time determined by the filtering conditions. As a result, a zero-point adjustment process can be initiated as soon as the weighing conveyor stabilizes under a no-load condition. In other words, zero-point adjustment can be effected efficiently without wasting any free time after a stable no-load condition is established and, since there are increased opportunities for a zero-point adjustment, corrections can be effected corresponding to changes in the length of target objects and weighing operations can be effected with higher accuracies.

BRIEF DESCRIPTION OF THE DRAWINGS

FIG. 1 is a schematic structural diagram of a weighing machine according to a first embodiment of the present invention;

FIG. 2 is a block diagram showing the structure of a digital filter;

FIG. 3 is a block diagram showing the functions of the control device of FIG. 1;

FIG. 4 is a side view of the weighing conveyor for showing how the transportation time for a target object is converted into and represented as a distance;

FIG. 5 is a schematic diagram showing the operation of the digital filter;

FIG. 6 is a schematic structural diagram of a weighing machine according to a second embodiment of the present invention;

FIG. 7 is a block diagram showing the functions of the control device;

FIG. 8 is a side view of the weighing conveyor for showing the detection inhibiting time, zero-point adjustment inhibiting time and the like as distances;

FIG. 9 is a block diagram of a portion of a weighing machine according to a third embodiment of the present invention;

FIGS. 10-12 show experimentally obtained attenuation characteristics of the first, second and third stage filters of a digital filter described below; and FIG. 13 shows the total attenuation by the three stages of the digital filter of FIGS. 10-12.

DETAILED DESCRIPTION OF THE INVENTION

In what follows, the present invention will be described by way of examples with the help of the drawings.

With reference to FIGS. 1-5 which describe a weighing machine according to a first embodiment of the invention, its weighing conveyor 1 includes a conveyor belt 4 which is stretched between a drive roller 2 connected to a motor (not shown) and an idler roller 3 and is supported by a load cell 5 serving as a weight detecting means. The weight of a target object M, which is transported onto the weighing conveyor 1 from a feed-in conveyor belt 6, is measured according to a timing schedule to be described below and is judged either acceptable or unacceptable in view of a target weight value. If it is adjudged unacceptable, it is discarded by a sorting means (not shown) disposed at a downstream location. If it is adjudged acceptable, it passes through the sorting means and is transported by means of a discharge conveyor 11 to a receiving station or the like.

On the receiving side of the weighing conveyor 1, there is an object detector 7 for optically detecting the presence of a target object M transported by the feed-in conveyor belt 6. The object detector 7 is composed of an optical sensor of the transmissive or reflective type, having a light-emitting element and a light-receiving element such that a detection signal will be transmitted if detection light emitted from the light-emitting element is blocked by the target object M and fails to be received by the light-receiving element.

The load cell 5 is adapted to output an analog signal indicative of the measured weight value. The analog signal outputted from the load cell 5 passes through a preamplifier 8 and is received by an analog-to-digital converter 9. The digital signals outputted from the analog-to-digital converter 9 are transmitted to a digital filter 10A, which is so structured as to extract a direct current component as a weight signal from the received digital signals.

As shown in FIG. 2, the digital filter 10A has its control unit 19 and program memory 12 connected to each other through a program bus 13, and a register 14, a data memory 15, an arithmetic and logic operation unit (ALU) 16 and a multiplication unit 17 connected together through a data bus 18 such that the take-in time for filter constants and the weight signal can be freely set by means of a control device 20 to be described below.

With reference again to FIG. 1, the control device 20 is composed of a microcomputer having a central processing unit (CPU) 21, a read-only memory (ROM) 22, a random-access memory (RAM) 23 and interface circuits 24. The control device 20 is adapted to receive data from the object detector 7 and a keyboard 26 (serving as a data inputting means for inputting various constants), and also weight data from a weight data memory circuit 60 to be described below. The control device 20 is also programmed to output filter constants to the digital filter 10A or weight data which, after the weight of a target object has been measured, may be believed the most trustworthy. The weight data memory circuit 60 stores a plurality of weight data outputted from the digital filter 10A.

FIG. 3 shows the functions of the microcomputer of which the control device 20 is composed, and the control device 20 is programmed as follows.

In FIG. 3, numeral 23a indicates a set value memory means which forms a part of the RAM 23 (shown in FIG. 1) and serves to store inputted values of the belt speed V and the length $L_m$ for a target object received from the keyboard 26. The speed of the weighing conveyor 1 is controlled by a belt speed control means 71 so as to be equal to the set value V stored in the set value memory means 23a.

Numeral 72 indicates a detection inhibiting time calculating means for calculating detection inhibiting time $T_{01}$ from the belt speed V and the length $L_m$ of the target object according to Equation (1) given as follows:

$$T_{01} = (\tfrac{1}{2})\{(L_m/V) + (L_m/V_{fc})\} \qquad \text{Eq. (1)}$$

where $V_{fc}$ is the speed of the feed-in conveyer belt 6 and the detection inhibiting time $T_{01}$ is defined, as illustrated in FIG. 4, as the time interval from when a detection signal is outputted from the object detector 7 until the target object is completely on the weighing conveyor 1.

Numeral 73 indicates an object transportation time calculating means for calculating object transportation time $T_{11}$ from the belt speed V and the length $L_m$ of the target object according to Equation (2) given as follows:

$$T_{11} = \{(L_c - L_m)/V\} + T_{01} \qquad \text{Eq. (2)}$$

where $L_c$ is the length of the weighing conveyor 1, and the object transportation time $T_{11}$ is defined, as also illustrated in FIG. 4, as the time interval from when the target object M reaches the object detector 7 until the front end of the target object M reaches the distal end of the weighing conveyor 1 away from the feed-in conveyor belt 6.

Numeral 74 indicates a thinning factor calculating means for determining what is herein referred to as the thinning factor N from the detection inhibiting time $T_{01}$, the object transportation time $T_{11}$ and the number P (such as 4) of weight data which may be considered necessary for obtaining a reliable weight value. The thinning factor N is a number which controls the response at the digital filter 10A, that is, the output interval of sampled weight signals expressed as the multiple of the sampling period $\Delta T$. More precisely, the thinning factor N will be herein defined as the number representing the ratio between the sampling period and the period of inputted signal.

Numeral 75 indicates a filtering time calculating means for calculating the response time $T_{n1}$ of the digital filter from the thinning factor N. Numeral 76 indicates a sampling time calculating means for calculating the sampling time $T_{31}$, during which sampling can be performed. It is calculated from the detection inhibiting time $T_{01}$, the object transportation time $T_{11}$ and the response time $T_{n1}$ of the digital filter according to Equation (3) given as follows:

$$T_{31} = T_{11} - T_{01} - T_{n1} \qquad \text{Eq. (3)}$$

This is illustrated in FIG. 4. The detection inhibiting time calculating means 72, the object transportation time calculating means 73 and the thinning factor calculating means 74 constitute what is herein referred to as a data processing condition setting means 70.

With reference still to FIG. 3, numeral 77 indicates a weight data outputting means for outputting the value considered the most trustworthy of the plurality of weight data stored in the weight data memory circuit 60. Numeral 78 indicates an automatic zero-point adjustment inhibiting time calculating means for calculating a zero-point adjustment inhibiting time $T_{41}$ from the belt speed V, the length $L_m$ of the target object and the response time $T_{n1}$ of the digital filter according to Equation (4) given as follows:

$$T_{41} = (L_m/V) + T_{n1}. \qquad \text{Eq. (4)}$$

The digital filter 10A may be either of a finite impulse response (FIR) type or of an infinite impulse response (IIR) type. The output from a FIR type digital filter is a sum of n input signals, each multiplied by a weight factor, where n is an integer. The output from an IIR type digital filter is an weighed sum of n input signals and m output signals where n and m are same or different integers. Generally, a FIR type is used where a quick response is desired from a rapidly varying input signal, while an IIR type may be preferred where the input is relatively stable but there are occasional noise components and it is desired to reduce the effects of such noise. The FIR and IIR types may be used in combination, and multi-stage filters may be used, depending on the system structure.

The operation of a FIR type digital filter with three stages will be explained next with reference to FIG. 5 wherein Line (I) represents weight signals outputted from the load cell 5 at regular intervals of $\Delta T$ (such as 0.5 millisecond). Let us assume that the first stage filter is of a FIR type with tap number=32 and thinning factor 1. Thus, the input to the first stage filter is at the same intervals as $\Delta T$ as shown in Line (II) and, as soon as the 32nd weight signal is received thereby, filtered signals begin to be outputted therefrom sequentially at the same intervals as shown in Line (III). Let us assume next that the second stage filter is also of a FIR type but with tap number=32 and thinning factor 2. Such a filter will sample only every other signal outputted from the first stage filter as shown in Line (IV) because its sampling interval is $2\Delta T$. As soon as the 32nd signal is sampled by the second stage filter (simultaneously as the 94th signal is being sampled by the first stage filter as shown in FIG. 5), it begins to output filtered signals sequentially at the same intervals ($2\Delta T$) as shown in Line (V). Let us assume further that the third stage filter is also of a FIR type with tap number=32 but that its thinning factor is 3. This means that the third stage filter, sampling signals outputted from the second stage filter at intervals of $3 \times 2\Delta T = 6\Delta T$. In other words, the total thinning factor due to all of these three stages is $N = 1 \times 2 \times 3 = 6$, and only one out of every three signals from the second stage filter is sampled by the third stage filter as shown in Line (VI). Since its tap number is 32, the first filtered output signal therefrom will be obtained only after the 32nd signal is sampled thereby (at the same time, for example, as the $3 \times (32-1) + 1 = 94$th signal is being outputted from the second stage filter as shown in FIG. 5. It is to be noted from FIG. 5 that a time interval of $(94 + 31 \times N)\Delta T$ ($=280\Delta T$ if $N=6$) will be required in this example in order to obtain the first filtered output signal from the third stage filter. As the thinning factor is increased, the lower limit of the signal frequency that can pass through the digital filter 10A becomes lower. Accordingly, the oscillatory load from the weighing conveyor 1 and the target object M which generate high-frequency components can be effectively removed.

Before a weighing operation is started, the belt speed V and the length $L_m$ of the target objects to be weighed are inputted from the keyboard 26 shown in FIG. 3. The weighing conveyor 1 is driven thereupon by the control device 20 in accordance with the inputted data, and the detection inhibiting time calculating means 72 and the object transportation time calculating means 73 calculate the detection inhibiting time $T_{01}$ and the object transportation time $T_{11}$, respectively, outputting corresponding signals to the thinning factor calculating means 74. What the thinning factor calculating means 74 actually does, according to the present invention, is to determine how large the overall thinning factor N of the digital filter 10A can be set for given values of the fundamental sampling period $\Delta T$, the detection inhibiting time $T_{01}$, the object transportation time $T_{11}$ and the value of P defined above (such as 4), and to output a signal indicative of the value of N so determined. Since $\{94+(32-1)\times N+(P-1)N\}\Delta T=\{94+(3+P)\times N\}\Delta T$ $(94+34\times N)\Delta T$ (if $P=4$) should not exceed $(T_{11}-T_{01})$, the largest allowable value of the thinning factor in the case of this example is obtained by the formula $N=\{(T_{11}-T_{01}/\Delta T-94\}/34$. In summary, the thinning factor calculating means 74 is adapted to output to the digital filter 10A a signal representative of the largest possible value for the thinning factor N such that the selected number P of weight data can be obtained within the sampling time $T_{31}$ during which filtering operation is allowed.

It is to be noted regarding the example considered above that the tap number was 32 in all three stages of the digital filter 10A. The formula for calculating the largest possible value of the overall thinning factor N of the digital filter 10A will depend not only on the number of stages as well as the tap number and the thinning factor for each of the stages. In what follows, these parameters which together determine the overall thinning factor N of the digital filter 10A will be summarily referred to as the filtering conditions, or filtering parameters. It is further to be noted that one or more of the stages may be of an IIR type, requiring a still different formula for calculating the overall thinning factor N.

When a target object M is placed on the feed-in conveyor belt 6 under the condition described above and reaches near the front end of the weighing conveyor 1 as shown in FIG. 4, a detection signal is outputted from the object detector 7, and the control device 20 prevents the detection of the target object M for a period of time given by the detection inhibiting time $T_{01}$ from the moment when this detection signal is inputted. The purpose of this inhibiting operation is to prevent the object detector 7 from misinterpreting a single target object M, depending on its shape, as a plurality of objects as this target object M is transferred from the feed-in conveyor belt 6 onto the weighing conveyor 1. After the detection inhibiting time $T_{01}$ has elapsed and the target object M is completely on the weighing conveyor 1, the control device 20 of FIG. 3 outputs a command to the digital filter 10A to have the weight signals from the load cell 5 sampled at constant intervals $\Delta T$.

These weight signals, thus sampled at the constant period $\Delta T$, are sequentially thinned out by the digital filter 10A by the thinning factor N determined by the control device 20, as explained above, such that high-frequency components are removed from the weight signals.

After the response time $T_{n1}$ of the digital filter of FIG. 4 has elapsed and data begin to be outputted from the digital filter 10A, the control device 20 causes these weight data to be transmitted to and stored in the weight data memory circuit 60. Still after the elapse of time period $T_{31}$, which is preliminarily obtained by calculation, the control device 20 stops the sampling operations by the digital filter 10A so as to prevent weight data with low reliability from being taken in.

The weight data outputting means 77 of the control device 20 reads out a plurality of weight data stored in the weight data memory circuit 60, selects and outputs a value considered the most trustworthy of the plurality of weight data obtained during the sampling time of $T_{31}$. The value to be selected may be the highest one, the average or the value which occurs most frequently.

After the elapse of zero-point adjustment inhibiting time $T_{41}$ from the moment when one of the target objects M is discharged from the weighing conveyor 1, the automatic zero-point adjustment function for the weighing conveyor 1 is activated because the weighing conveyor 1 is now in a condition to allow such automatic zero-point adjustment. If another object to be weighed is transported onto the weighing conveyor 1 from the feed-in conveyor belt 6 when the automatic zero-point adjustment is about to be started, however, the zero-point adjustment is not carried out, and the control device 20 measures the weight of the newly arrived object by a similar process and outputs a weight value therefor considered to be the most trustworthy. When the length $L_m$ of the target object to be weighed or the belt speed V of the weighing conveyor 1 is to be changed, the new value is inputted from the keyboard 26. The control device 20 calculates the detection inhibiting time $T_{01}$, the object transportation time $T_{11}$, the sampling time $T_{31}$, the thinning factor N, the response time $T_{n1}$ of the digital filter and the zero-point adjustment inhibiting time $T_{41}$ from the newly inputted value of the length $L_m$ or the belt speed V. The data processing condition setting means 70 changes the filter constants of the digital filter 10A on the basis of the new values of the detection inhibiting time $T_{01}$, the object transportation time $T_{11}$ and the thinning factor N. Thereafter, the digital filter 10A performs filtering operations under optimum conditions for the new values of the belt speed V and the length $L_m$ of the target object.

With the belt speed V of the weighing conveyor 1 known, data on the length $L_m$ of a target object M may be obtained automatically by measuring a traveling time of the object M.

A second embodiment of the present invention is described next with reference to FIGS. 6–8 wherein like components are generally indicated by the same numerical symbols. In FIGS. 6 and 7, numeral 10 indicates a digital filter, outputs from which are adapted to be received by the control device 20. The digital filter 10 is comprised of a digital signal processor and programmed so as to function as a low pass filter of a finite impulse response (FIR) type. The control device 20 is programmed so as to receive a signal from the object detector 7, data from the keyboard 26 (serving as data inputting means for inputting various data) and weight signals from the digital filter 10 so as not only to perform various functions to be described below but also to output control parameters to the digital filter 10 and display data to a display device (not shown).

With reference next to FIG. 7 which shows the functions of the microcomputer constituting the control device 20 of FIG. 6, the RAM 23 stores the length $L_c$ of the weighing conveyor, the length $L_m$ of the target object to be weighed, the sampling time period $T_3$ during which sampling may be carried out and the belt speed V. The ROM 22 stores a program which enables the control device 20 to perform its intended functions to be described below.

With reference still to FIG. 7, numeral 30 indicates a detection inhibiting time calculating means for calculating a transportation time (as detection inhibiting time $T_0=L_m/V$) corresponding to the length $L_m$ of the target object and outputting this value as a signal to a detection inhibiting means 32. The detection inhibiting means 32 serves to start a measurement starting timer 31 when a detection signal is received from the object detector 7 and to cause the detection signal to be ignored, although it may be repeatedly switched on and off, until a time period equal to the detection inhibiting time $T_0$ elapses from the start of the timer 31.

Numeral 33 indicates an object transportation time calculating means for calculating the object transportation time $T_1$ ($=L_c/V$) for the target object M on the weighing conveyor 1 by using the stored values of the length $L_c$ and the belt speed V. Numeral 34 indicates a filter response time calculating means for calculating the response time $T_n$ of the digital filter 10 as shown in FIG. 8 by using the calculated value of the object transportation time $T_1$, the set value of the sampling time $T_3$ and the detection inhibiting time $T_0$ as $T_n = T_1 - T_0 - T_3$. Numeral 35 indicates a filter constant calculating means for calculating filter constants from this response time $T_n$ of the digital filter and outputting them as signals to the digital filter 10 to thereby determine filter characteristics. The object transportation time calculating means 33, the filter response time calculating means 34 and the filter constant calculating means 35 constitute a data processing condition setting means. Numeral 36 indicates a measurement timing calculating means for calculating the unstable time $T_2$ between when a target object M is brought onto the weighing conveyor 1 and when weight signals begin to be taken in. The unstable time $T_2$ may be calculated either from the response time $T_n$ of the digital filter and the detection inhibiting time $T_0$ according to the relationship $T_2 = T_n + T_0$ or from the object transportation time $T_1$ and the sampling time $T_3$ according to the relationship $T_2 = T_1 - T_3$.

The measurement starting timer 31 of FIG. 7 starts its time counting operation when the object detector 7 detects the front end of the target object M and stops it when it counts up a time period equal to the unstable time $T_2$ which has been set. Thereafter, the weight signals outputted at constant intervals from the digital filter 10 are sequentially stored in a weight data memory 37 formed on a specified area of the RAM 23.

Numeral 39 indicates an automatic zero-point adjustment inhibiting time calculating means for calculating the zero-point adjustment inhibiting time $T_4$ from the transportation time $T_1$ for the object M on the weighing conveyor 1 and the unstable time $T_2$ according to the relationship $T_4 = T_1 + T_2$ as illustrated in FIG. 8 and setting its value in another timer 38 (shown in FIG. 7) herein referred to as the zero-point input inhibiting timer. With the zero-point adjustment inhibiting time $T_4$ thus set, the zero-point input inhibiting timer 38 starts its time counting operation when the front end of the target object M to be weighed is detected by the object detector 7 and stops it after an elapse of this zero-point adjustment inhibiting time $T_4$. Thereafter, the weight signals outputted at constant intervals from the digital filter 10 are stored in another memory device 40 herein referred to as the zero-point memory.

Numeral 41 indicates a weight calculating means for calculating the net weight of the target object M by subtracting the zero-point value stored in the zero-point memory 40 from the data in the weight data memory 37. Numeral 42 indicates a belt speed control means for adjusting the transportation speeds of the weighing conveyor 1 and the feed-in conveyor belt 6 according to the inputted belt speed V.

Next, the operation of the weighing machine described above by way of FIGS. 7 and 8 will be explained. First, the weighing machine is set in a registration mode from the keyboard 26, and the length $L_c$ of the weighing conveyor 1, the length $L_m$ of the target object M to be weighed, the sampling time $T_3$ during which sampling is to be allowed and, if necessary, also the belt speed V are inputted. The control device 20 causes these data to be stored on a specified area of the RAM 23 and performs certain specified calculations by using them. For example, the detection inhibiting time calculating means 30 determines a detection inhibiting time $T_0$ ($=L_m/V$) from the belt speed V and the length $L_m$ of the target object, although the detection inhibiting time $T_0$ may also be obtained in the same way as the value of $T_{01}$ was obtained by Equation (1), as explained above with reference to a different embodiment of the present invention. Similarly, the object transportation time calculating means 33 determines an object transportation time $T_1$ ($=L_c/V$) from the length $L_c$ of the weighing conveyor and the belt speed V, although the object transportation time $T_1$ may also be obtained as the value of $T_{11}$ was obtained by Equation (2). The filter response time calculating means 34 calculates $T_n = T_1 - T_0 - T_3$ to determine a response time $T_n$ for the digital filter from the object transportation time $T_1$, the sampling time $T_3$ and the detection inhibiting time $T_0$. If the filtering time is sufficiently long, however, the response time may be set shorter than the calculated value of $T_n$.

The filter constant calculating means 35 calculates filter constants from this response time $T_n$ of the digital filter and outputs them as signals to the digital filter 10 to thereby determine filter characteristics. In this manner, the response time $T_n$ can be made longer if the length $L_m$ of the target object is small such that the digital filter 10 can be operated more effectively. In the case of a longer target object with a large value of $L_m$, on the other hand, the response time $T_n$ of the digital filter may be made shorter such that the weighing capability will not be adversely affected. A short response time $T_n$ of the digital filter may give rise to the danger of external disturbances, but sufficiently accurate weight data can be obtained as a practical matter, for example, by subjecting the weight values to a translational averaging process.

The measurement timing calculating means 36 of FIG. 7 determines the unstable time $T_2 = T_n + T_0$. The unstable time $T_2$ may also be calculated from the object transportation time $T_1$ and the sampling time $T_3$. The value of the unstable time $T_2$ thus calculated is set in the measurement starting timer 31. The belt speed control means 42 adjusts the transportation speeds of the conveyors 1, 6 and 11 according to the inputted value of the belt speed V. In applications where there is no need to change the belt speed V, the belt speed control means 42 may be absent.

When the registration is completed, the keyboard 26 is operated to change the mode of operation from the registration mode to the weighing mode. When a target object M to be weighed reaches the position of the object detector 7 from the feed-in conveyor 6, a detection signal is outputted from the object detector 7. When this detection signal is received by the control device 20, the detection inhibiting means 32 activates the measurement starting timer 31. Until the detection inhibiting time $T_0$ elapses thereafter, that is, until the whole of the target object M passes the position of the object detector 7, all changes in the signals from the object detector 7 are ignored. Thus, it is the signal which was outputted when the front end of the target object M reached the object detector 7 that is used as the reference time for the subsequent data processing.

The digital filter 10 operates in synchronism with the analog-to-digital converter 9 to sequentially receive numerical data therefrom, to carry out filtering operations according to a specified formula by using inputted new numerical data and a row of old numerical data, and to output a result to the control device 20. The measurement starting counter 31 starts counting when the target object M is detected, stops counting when the unstable time $T_2$ shown in FIG. 8 has elapsed and stores on the weight data memory 37 the weight data outputted from the digital filter 10 of FIG. 7. The weight calculating means 41 subtracts the zero-point value stored in the zero-point memory 40 from the weight data stored in the weight data memory 37, thereby determining the net weight of the target object M and outputting its value to a display device (not shown). By the time the display is made, the target object M is already on its way to be discharged from the weighing conveyor 1.

The weighing conveyor 1 becomes unloaded as soon as the target object M is completely discharged from it, but it is not in a perfect zero-load condition until the unstable time period $T_2$ elapses because the vibrations of the conveyor 1 have not been sufficiently attenuated. In other words, the signal from the load cell 5 cannot be considered to represent a true zero-load condition. Thus, the automatic zero-point adjustment inhibiting time calculating means 39 calculates the zero-point adjustment inhibiting time $T_4$ from the object transportation time $T_1$ and the value of the unstable time $T_2$ by the relationship $T_4 = T_1 + T_2$ and sets this value in the zero-point input inhibiting timer 38. The zero-point input inhibiting timer 38 begins to count in synchronism with the measurement starting timer 31 when the front end of the target object M is detected, stops counting after the zero-point adjustment inhibiting time $T_4$ has elapsed and thereafter stores the weight signals outputted from the digital filter 10 on the zero-point memory 40. Accurate weight values can thus be obtained because the zero-point memory 40 now stores a weight signal corresponding to what may be considered a stabilized condition after the vibrations of the weighing conveyor 1 have been sufficiently attenuated.

If a next target object M is detected before the elapse of this zero-point adjustment inhibiting time $T_4$, the zero-point input inhibiting timer 38 is reset and starts its counting operation from the beginning. Thus, the zero-point is updated only when two successive target objects are transported with a longer time interval in between than the zero-point adjustment inhibiting time $T_4$. If this interval is short, the previous zero-point value is used. In this manner, variations in the zero-point of the weighing machine caused by time changes can be corrected without adversely affecting the work efficiently.

If the length $L_m$ of the target objects M to be weighed or the belt speed V is to be changed, the new value is entered from the keyboard 26. On the basis of the new value of the length $L_m$ or the belt speed V, the control device 20 calculates the detection inhibiting time $T_0$, the object transportation time $T_1$ and the response time $T_n$ for the digital filter and changes the filter constants of the digital filter 10 on the basis of these data. Thus, the digital filter 10 not only carries out its filtering operation under conditions that are optimum to the changed values of the belt speed V and the length $L_m$ but also changes the value of the zero-point adjustment inhibiting time $T_4$.

As an alternative to the embodiment of the invention described above, different values of $L_m$ may be preliminarily stored in a memory device for each kind of objects to be weighed such that the user has only to input a new call number from the keyboard 26 when it is desired to change the value of the length $L_m$. Regarding the belt speed V, it may be set at a fixed value or a speed detector may be provided to detect the speed and register its value.

FIG. 9 shows a weighing machine according to still another embodiment of the invention, characterized wherein a target object M is transported in the registration mode of operation such that the detection inhibiting time $T_0$ can be set automatically. It includes a transportation time measuring means 50 for measuring the time at which the detection signal is outputted from the object detector 7 to thereby store, as the detection inhibiting time $T_0$, the transportation time corresponding to the length $L_m$ of the target object to be weighed. This transportation time measuring means 50 is designed such that, while it is measuring the output time of a signal from the object detector 7, occurrence of OFF-conditions (that is, no-detection conditions) shorter than a specified minimum length will be ignored and hence that an accurate value of the detection inhibiting time $T_0$ can be obtained independent of the shape of the target object M.

A weighing machine according to this embodiment may also be designed such that different values of the detection inhibiting time $T_0$ are preliminarily calculated and registered for target objects of different lengths and a right value of $T_0$ corresponding to a given target object can be called by its call number. If the detection inhibiting time $T_0$ is to be automatically set by merely transporting a target object M to be weighed, the object M is sent from the feed-in conveyor belt 6 onto the weighing conveyor 1 in the registration mode of operation. The object detector 7 outputs detection signals as long as it keeps detecting the object M. The length $L_m$ of the target object M can be determined by measuring the output time of these detection signals by the transportation time measuring means 50, and the length $L_m$ thus determined is set in the detection inhibiting means 32 as the detection inhibiting time $T_0$.

In all of the embodiments of the invention described above, data such as the belt speed V, the length $L_c$ of the weighing conveyor, the length $L_m$ of the target object to be weighed and the sampling time $T_3$ are inputted through a keyboard serving as data inputting means. Since the length $L_m$ of the target object will have to be inputted each time objects of a different size are to be weighed, it may be a practical idea to paste a scale on a structure such as a cover disposed along the travel path of the weighing conveyor such that the object M to be weighed can be placed against it to have its approximate length determined directly.

It is also to be remembered that no particular selection of filtering parameters for the filtering operation is intended to limit the scope of the invention. In what follows, there will be shown results of an experiment performed for testing. For this experiment, weight signals were sampled at intervals of 0.5 millisecond by a digital filter with three FIR type stages. The first stage had tap number=32 and performed simple averaging on 32 inputted weight data. The attenuation was small but the cutoff frequency was as low as 14.4 Hz and the gain became less than −20 dB for the first time at 58 Hz as shown in FIG. 10. Since this is effective in the lower frequency region, it is considered useful for the attenuation of driving noise. The second stage was a filter with tap number=32 and weight factors determined by a hanning window function. The thinning factor for the second stage was 3. This filter had only low filtering effects in the low frequency region but high attenuation was obtained in the high frequency region as shown in FIG. 11. The third filter was a Chebyshev filter with tap number selectively either 32 or 64, having three Chebyshev characteristics which were selectable corresponding to each of these tap numbers such that its filtering characteristics could be varied by properly selecting filtering parameters. Higher filtering effects can be obtained with tap number=64 but the response delay becomes larger. The thinning factor for the third stage was made variable between 3 and 255 such that the cutoff frequency could be lowered by increasing the thinning factor. If the thinning factor is increased, the filtering effect becomes higher but the response delay becomes greater. Chebyshev filters have superior cutoff characteristics and steep attenuation property, and it was possible to obtain a high, stable attenuation rate from a relatively low frequency region. FIG. 12 shows the attenuation by the third stage filter with tap number=32. FIG. 13 shows the total attenuation from all three stages. According to a preferred embodiment of the present invention, filtering conditions, such as the tap numbers and the thinning factors of its individual stages are made selectable according to the processing capability of the system such that a maximum filtering effect can be automatically obtained.

This invention is applicable to weighing machines for continuously weighing objects such as merchandises which are already weighed and packaged.

What is claimed is:

1. A weighing machine comprising:
   a weighing conveyor having weight detecting means for detecting weight and a belt for transporting an object to be weighed, said belt being supported by said weight detecting means;
   data inputting means for allowing a user to input a belt speed value indicative of a speed of said belt and a length value indicative of a length of said object in a direction of transportation thereof by said belt;
   belt speed control means for controlling the speed of said belt according to said belt speed value inputted through said data inputting means;
   condition setting means for setting filtering conditions for said object on a basis of said belt speed value and said length value inputted from said data inputting means; and
   digital filter means or digitally filtering weight signals from said weight detecting means under said filtering conditions set by said condition setting means.

2. The weighing machine of claim 1 wherein said condition setting means calculates and determines a thinning factor for said digital filter means indicative of the frequency of signal outputs from said digital filter means.

3. The weighing machine of claim 2 wherein said thinning factor is calculated as a function of the difference between detection inhibiting time and object transportation time, said detection inhibiting time being the time it takes for said object to be transported completely onto said weighing conveyor from a feed-in conveyor, said object transportation time being the time during which said object is completely on said weighing conveyor.

4. A weighing machine comprising:
   a weighing conveyor having weight detecting means for detecting weight and a belt for transporting an object to be weighed, said belt being supported by said weight detecting means;
   object detecting means disposed at an object-receiving end of said weighing conveyor for detecting said object to be weighed;
   data inputting means for allowing a user to input a length value indicative of a length of said object in a direction of transportation thereof by said belt;
   detection inhibiting time calculating means for determining detection inhibiting tim by calculating transportation time from said length value inputted through said data inputting means and a speed value indicative of a speed of said belt; and
   detection inhibiting means for causing detection signals from said object detecting means to be ignored until said detection inhibiting time elapses from when said object detecting means detects a front end of said object to be weighed.

5. A weighing machine comprising:
   a weighing conveyor having weight detecting means for detecting weight and a belt for transporting an object to be weighed, said belt being supported by said weight detecting means;
   object detecting means disposed at an object-receiving end of said weighing conveyor for detecting said object to be weighed;
   detection inhibiting time setting means for measuring output time of detection signals from said object detecting means when said object to be weighed is transported onto said weighing conveyor and storing said output time as detection inhibiting time corresponding to a length of said object in a direction of motion of said belt; and
   detection inhibiting means for causing detection signals from said object detecting means to be ignored until said detection inhibiting time elapses from when said object detecting means detects a front end of said object to be weighed.

6. A weighing machine which normally performs zero-point adjustment, said weighing machine comprising:
   a weighing conveyor having weight detecting means for detecting weight and a belt for transporting an object to be weighed, said belt being supported by said weight detecting means;
   condition setting means for calculating filtering conditions for said object from a speed of said belt and a length of said object in a direction of transportation thereof;
   digital filter means for receiving control signals from said condition setting means to thereby digitally filter weight signals from said weight detecting means; and
   zero-point adjustment inhibiting time calculating means for calculating zero-point adjustment inhibiting time from a length of said weighing conveyor, the speed of said belt, the length of said object in the direction of transportation thereof and said filtering conditions, said weighing machine being prevented from performing zero-point adjustment during said zero-point adjustment inhibiting time.

7. The weighing machine of claim 1 wherein said filtering conditions are determined such that filtered signals outputted from said digital filter means are just beginning to be stable when said object to be weighed ceases to be completely on said weighing conveyor.

8. The weighing machine of claim 1 further comprising weight data memory means for storing weight signals outputted from said digital filter means and a control device serving to select a weight value from said weight signals stored in said weight data memory means and to output said weight value.

9. The weighing machine of claim 1 further comprising zero-point adjustment control means for calculating and determining zero-point adjustment inhibiting time at least from said speed value, said length value and said filtering conditions and preventing said control device to perform zero-point adjustment during said zero-point adjustment inhibiting time.

10. The weighing machine of claim 4 wherein said detection inhibiting time calculating means calculates and determines transportation time for transporting said object to be weighed by its length and stores said transportation time as said detection inhibiting time.

11. The weighing machine of claim 6 further comprising:
object detecting means disposed at object-receiving end of said weighing conveyor for detecting an object to be weighed; and
a zero-point timer which is adapted to count said zero-point adjustment inhibiting time from when front end of said object is detected by sa id object detecting means and to allow said digitally filtered weight signals to be stored on a zero-point memory only thereafter.

12. The weighing machine of claim 6 wherein said filtering conditions are determined such that filtered signals outputted from said digital filter means are just beginning to be stable when said object to be weighed ceases to be completely supported by said weighing conveyor.

13. The weighing machine of claim 1 wherein said digital filter means includes three digital filters operating in stages, said three digital filters having same or different tap numbers and sampling data at same or different intervals.

14. The weighing machine of claim 6 wherein said digital filter means includes three digital filters operating in stages, said three digital filters having same or different tap numbers and sampling data at same or different intervals.

15. A weighing machine comprising:
a weighing conveyor having weight detecting means for detecting weight and a belt for transporting an object to be weighed, said belt being supported by said weight detecting means;
condition setting means for setting filtering conditions for said object on a basis of a time length during which said object to be weighed is on said belt; and
digital filter means for digitally filtering weight signals from said weight detecting means under said filtering conditions set by said condition setting means.

16. The weighing machine of claim 15 wherein said time length is determined from the length $L_c$ and speed V of said belt and the length $L_m$ of said object.

17. The weighing machine of claim 16 wherein said time length is determined by calculating $(L_c - L_m)/V$.

18. The weighing machine of claim 16 further comprising data inputting means for allowing a user to input a belt speed value indicative of the speed V of said belt and a length value indicative of the length $L_m$ of said object in the direction of transportation thereof by said belt.

* * * * *